A. E. FOLLOWS.
ARTIFICIAL TOOTH.
APPLICATION FILED JULY 14, 1913.
1,089,201. Patented Mar. 3, 1914.
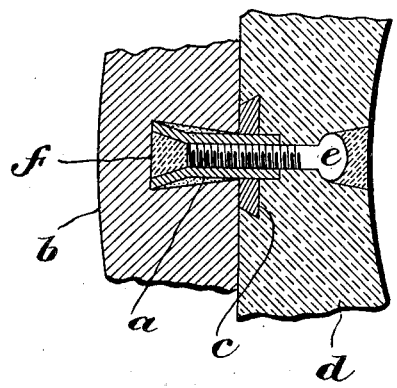

UNITED STATES PATENT OFFICE.

ALBERT EDWARD FOLLOWS, OF WAVERTREE, LIVERPOOL, ENGLAND.

ARTIFICIAL TOOTH.

1,089,201.  Specification of Letters Patent.  Patented Mar. 3, 1914.

Application filed July 14, 1913. Serial No. 778,925.

*To all whom it may concern:*

Be it known that I, ALBERT EDWARD FOLLOWS, a subject of the King of Great Britain and Ireland, residing at Wavertree, Liverpool, in the county of Lancaster, England, have invented Improvements Relating to Artificial Teeth, of which the following is a specification.

This invention relates to artificial teeth and particularly to the attachment thereof to vulcanite or other dentures by means of hollow pins of metal secured at one end in the teeth and at the other end in the dentures.

The object of this invention is to provide an artificial tooth fastening arrangement employing hollow metal pins by means of which the tooth if damaged can be readily replaced on the denture by a new one so that the advantages of interchangeability are obtained and combined therewith a cheapness and durability heretofore unobtainable.

According to this invention the complete artificial tooth comprises a tooth of porcelain or the like material not embodying any metallic fastening member and formed with an undercut or dovetailed recess, and a hollow securing pin adapted to be secured at one end to a denture of any usual kind and to afterward have its other end secured in the recess of said porcelain tooth; the end of the hollow pin that enters the recess in the tooth being swelled or expanded in any suitable way to afford a secure attachment.

The drawing shows in horizontal section an artificial tooth fastened to a denture according to this invention.

Similar letters refer to like parts throughout the drawings.

The letter $a$ is the hollow pin which is internally screw threaded and has one end embedded in a suitable tapered cavity formed in the artificial tooth $b$, the opposite end after passing through a supporting plate $c$ which may be embedded either in the tooth or denture, enters and is embedded in the vulcanite casing $d$. The pin $a$ has one end split as by a saw cut so as to be expansible. In the arrangement shown an expanding plug $f$ of soft material is inserted in the end of the hollow pin $a$. From the back of the denture, through a hole which is afterward closed by a plug of suitable material, the pin $e$ is screwed down into the hollow pin thus compressing the expanding plug and thereby forcing outwardly the slitted end of the hollow pin $a$ until it expands and fits the dovetail cavity of the tooth, simultaneously retaining and pressing cement which has been placed in the cavity firmly around the hollow pin.

What I claim is:—

In an artificial tooth attachment, a denture, a hollow securing pin slit at one end and adapted to be secured at its other end to said denture, an artificial tooth formed of porcelain with an undercut recess, a plug adapted to be placed in the slitted end of said pin, and a screw for compressing said plug to expand the slitted end of said tube in the recess of said tooth.

Signed at Tower Buildings, Water street, Liverpool, this first day of July 1913.

ALBERT EDWARD FOLLOWS.

Witnesses:
 FREDERICK MCCLURE SCOTT,
 WILLIAM FORCE STEAD.